(12) United States Patent
Fujibayashi et al.

(10) Patent No.: US 6,640,291 B2
(45) Date of Patent: Oct. 28, 2003

(54) APPARATUS AND METHOD FOR ONLINE DATA MIGRATION WITH REMOTE COPY

(75) Inventors: Akira Fujibayashi, San Jose, CA (US); Akira Yamamoto, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 09/927,167

(22) Filed: Aug. 10, 2001

(65) Prior Publication Data

US 2003/0033494 A1 Feb. 13, 2003

(51) Int. Cl.$^7$ .............................................. G06F 12/00
(52) U.S. Cl. .................. 711/162; 711/161; 711/165; 714/6; 714/7
(58) Field of Search ........................ 711/161, 162, 711/165; 714/6, 7

(56) References Cited

U.S. PATENT DOCUMENTS

| | | | | | |
|---|---|---|---|---|---|
| 5,742,792 | A | * | 4/1998 | Yanai et al. | 711/162 |
| 5,896,548 | A | * | 4/1999 | Ofek | 710/20 |
| 6,073,220 | A | * | 6/2000 | Gunderson | 711/162 |
| 6,081,875 | A | * | 6/2000 | Clifton et al. | 711/162 |
| 6,173,377 | B1 | * | 1/2001 | Yanai et al. | 711/162 |
| 6,502,205 | B1 | * | 12/2002 | Yanai et al. | 714/7 |
| 2002/0002638 | A1 | * | 1/2002 | Obara | 710/11 |

OTHER PUBLICATIONS

"Symmetrix Data Migration Services" *EMC$^2$ The Enterprise Storage Company*, Data Sheet L.539.1, Dec. 1997, pp. 1–4.
"Care–the *Copy* suite" Hitachi Data Systems, Care Software Solutions Hitachi On–line Data Migration, 1999, pp. 1–3.
Alison Pate, et al. "RAMAC Virtual Array, Peer–to–Peer Remote Copy, and IXFP/SnapShot for VSE/ESA" *IBM International Technical Support Organization*, Jan. 1999, Index iii–viii, pp. 1–73.

* cited by examiner

*Primary Examiner*—Donald Sparks
*Assistant Examiner*—Jasmine Song
(74) *Attorney, Agent, or Firm*—Squire, Sanders & Dempsey L.L.P.

(57) ABSTRACT

In one embodiment, a new storage system is connected to an old storage system destined for replacement. Prior to starting online data migration, remote copy configuration information from the old storage system is migrated to the new storage system. The aforementioned allows either the new storage system or the old storage system, depending on configuration, to maintain an operational remote copy function with another storage system during the online data migration. The old and new storage systems can be primary storage systems located in a local site. The old and new storage systems can also be secondary storage systems located in a site remotely located from a local site.

20 Claims, 7 Drawing Sheets

FIG. 9

APPARATUS AND METHOD FOR ONLINE DATA MIGRATION WITH REMOTE COPY

BACKGROUND OF THE INVENTION

1. Field of the Invention

This invention relates generally to computer systems, and more particularly to systems, methods, and associated apparatus for computer data migration.

2. Description of the Background Art

Online data migration is the process of transferring data from an old storage system to another while data stored in the old storage system remain accessible. Online data migration has become popular with computer users because it allows for storage system replacements with minimum impact on services. Online data migration, in general, is known in the art; e.g., see the paper "CARE Software Solutions, Hitachi On-line Data Migration", available from Hitachi Data Systems of Santa Clara, Calif., incorporated herein by reference in its entirety.

"Remote copy" is a mirroring technology that involves the copying of data from a local site to a remote site for back-up purposes. Typically, remote copy is done in real-time to provide continuous data protection, and thereby minimize data loss in the event of a disaster such as a storage system crash or unscheduled facility shutdown (e.g., due to fire, earthquake, power loss, etc.). Remote copy software and associated apparatus have been develop for backing-up the storage systems of a local mainframe computer using remote storage systems.

Computer users who have already implemented remote copy face a dilemma when replacing their storage systems during an online data migration. On the one hand, these users typically have a need to upgrade their old storage systems in order to take advantage of the faster speed and higher capacity of newer storage systems. On the other hand, they cannot afford to disrupt their existing remote copy functions, and risk the possibility of data loss, during the online data migration process. Because currently available techniques for performing online data migration require that the remote copy function be stopped for long periods of time and/or reconfigured after the migration (which also takes a long time because the remote copy has to start over from an initial copy), most users do not have a choice but to risk data loss during the migration process.

From the foregoing, a technique for performing online data migration with minimum impact on remote copy is highly desirable.

SUMMARY

The present invention relates to methods, systems, and apparatus for performing online data migration with remote copy. In one embodiment, a new storage system is connected to an old storage system destined for replacement. Prior to starting online data migration, remote copy configuration information from the old storage system is migrated to the new storage system. This allows either the new storage system or the old storage system, depending on configuration, to maintain an operational remote copy function with another storage system during the online data migration.

In one embodiment, the old and new storage systems are primary storage systems located in a local site. In that case, during the online data migration, write data destined for the old primary storage system are written to both the old and new primary storage systems to maintain data integrity.

In one embodiment, the old and new storage systems are secondary storage systems located in a site remotely located from a local site.

These and other features and advantages of the present invention will be readily apparent to persons of ordinary skill in the art upon reading the entirety of this disclosure, which includes the accompanying drawings and claims.

DETAILED DESCRIPTION

Figure 1:
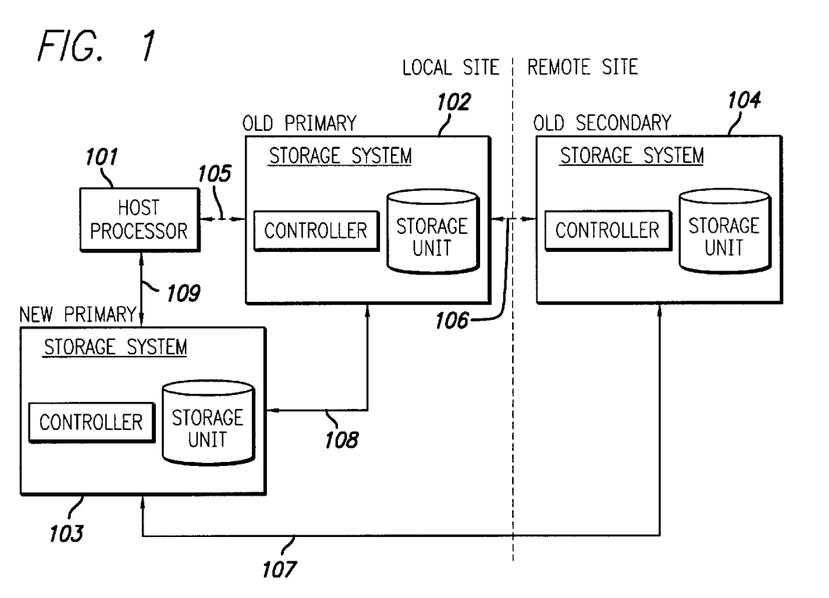
FIG. 1 schematically illustrates an online data migration setup for replacing a primary storage system in accordance with an embodiment of the present invention.

FIG. 1 schematically illustrates an online data migration setup for replacing a primary storage system with another from the same manufacturer, in accordance with an embodiment of the present invention. In the setup of FIG. 1, host processor 101, old primary storage system 102, and new primary storage system 103 are located in a local site, whereas old secondary storage system 104 is located in a remote site. As used throughout the present disclosure, the term "primary storage system" refers to a storage system located in a local site, while the term "secondary storage system" refers to a back-up storage system located in a remote site.

In FIG. 1, host processor 101 is a mainframe-type host processor. It should be understood, however, that the invention is not so limited, and is applicable to computer systems in general. Old primary storage system 102 and new primary storage system 103 are both from the same manufacturer (e.g., Hitachi Data Systems), and are, generally speaking, hardware and/or software compatible. Storage systems, in general, have a controller and one or more storage units. The controller, which directs the operation of the storage system, includes a set of channel interfaces for communicating with the host processor and other storage systems, a local processor and associated memory for running internal processes, a cache controller and associated cache memory for performing caching operations, and a storage unit interface for communicating with internal storage units. The storage units contain media for storing data (e.g., tape, magnetic disk, optical disk). In the present embodiment, the storage units are disk units, and the storage media are either optical or magnetic disks. Storage systems are available from various manufacturers including Hitachi Data Systems.

Still referring to FIG. 1, old primary storage system 102 is to be replaced with new primary storage system 103. Prior to its replacement, old primary storage system 102 was coupled to host processor 101 via a connection 105; data on old primary storage system 102 were backed-up on old secondary storage 104 using a remote copy function over connection 106. As used throughout the present disclosure, the term "connection" generally refers to a communications link, and may be in-bound (e.g., a mainframe I/O channel) or out-bound (e.g., an Ethernet link). A connection can be moved in a variety of ways including by re-routing or replacing the physical cables making the connection, or by making logical changes (e.g., by changing the value of registers, pointers, memory locations) to redirect data to a new communications path.

An on-line data migration using the setup of FIG. 1 is now described with reference to the method of FIG. 2. Referring to action 202 of FIG. 2, replacing old primary storage system 102 with new primary storage system 103 begins by connecting old primary storage system 102 to new primary storage system 103 via a connection 108. Because new primary storage system 103 is not yet activated, action 202 can be performed without disrupting the operation of host processor 101 and the remote copy function between old primary storage system 102 and old secondary system 104. In action 204, the remote copy function between old primary storage system 102 and old secondary storage system 104, as well as communications between old primary storage system 102 and host processor 101 are disrupted.

In action 206, connection 105 between host processor 101 and old primary storage system 101 is removed, and a connection 109 (see FIG. 1) between host processor 101 and new primary storage system 103 is established.

In action 208, remote copy configuration information is migrated from old primary storage system 102 to new primary storage system 103 via connection 108. Generally speaking, "migration" is the process of transferring data from one storage system to another. Migration may involve copying of data as-is if both storage systems are functionally identical; otherwise, some data format conversion may be necessary. Because old primary storage system 102 and new primary storage system 103 are from the same manufacturer in the instant case, the migration process is relatively straightforward and the remote copy configuration information is migrated as-is (with minor modifications to reflect the new copy-pair as explained below).

The remote copy configuration information specifies the setup for copying data from a primary storage system to a secondary storage system. It includes a copy-pair information, which identifies a storage system in the remote site designated to "mirror" a storage system in the local site. An example copy-pair information is shown in Table 1.

TABLE 1

EXAMPLE COPY-PAIR INFORMATION

Local Storage System
Local Logical Storage Unit

TABLE 1-continued

EXAMPLE COPY-PAIR INFORMATION

Remote Storage System
Remote Logical Storage Unit

As shown in Table 1, a copy-pair information also specifies which logical storage unit in a particular storage system in the local site is paired with a logical storage unit in a particular storage system in the remote site. As part of the migration of the remote copy configuration information, the copy-pair information is updated to reflect the new pair of storage systems. The storage systems, and the logical storage units in the storage systems, are identified by their respective addresses and other location information such as the connection between the local and remote storage systems. During remote copy, data written on a local logical storage unit are copied to the corresponding remote logical storage unit. Because data caching is employed in the storage systems, the copying may be performed right away or at some later time.

The remote copy configuration information also includes a control bitmap and some management information. The control bitmap has information showing the difference between data on the local and remote storage systems. In one embodiment, the control bitmap includes information indicating which data blocks have been updated and thus need to be copied to the remote storage system. The management information includes the status of the pair of storage systems. In one embodiment, the pair of storage systems can either be in the SUSPEND, PAIR, or COPY state. SUSPEND indicates that the remote copy process between the local and remote storage systems is suspended. The difference between the local and remote storage systems, which is reflected in the control bitmap, increases in the SUSPEND state. PAIR indicates that there is no difference between the local and remote storage systems, thus allowing write requests to be processed immediately (synchronous mode) or periodically (asynchronous mode). COPY indicates that data are being copied from the primary storage system to the corresponding secondary storage system.

Figure 2:
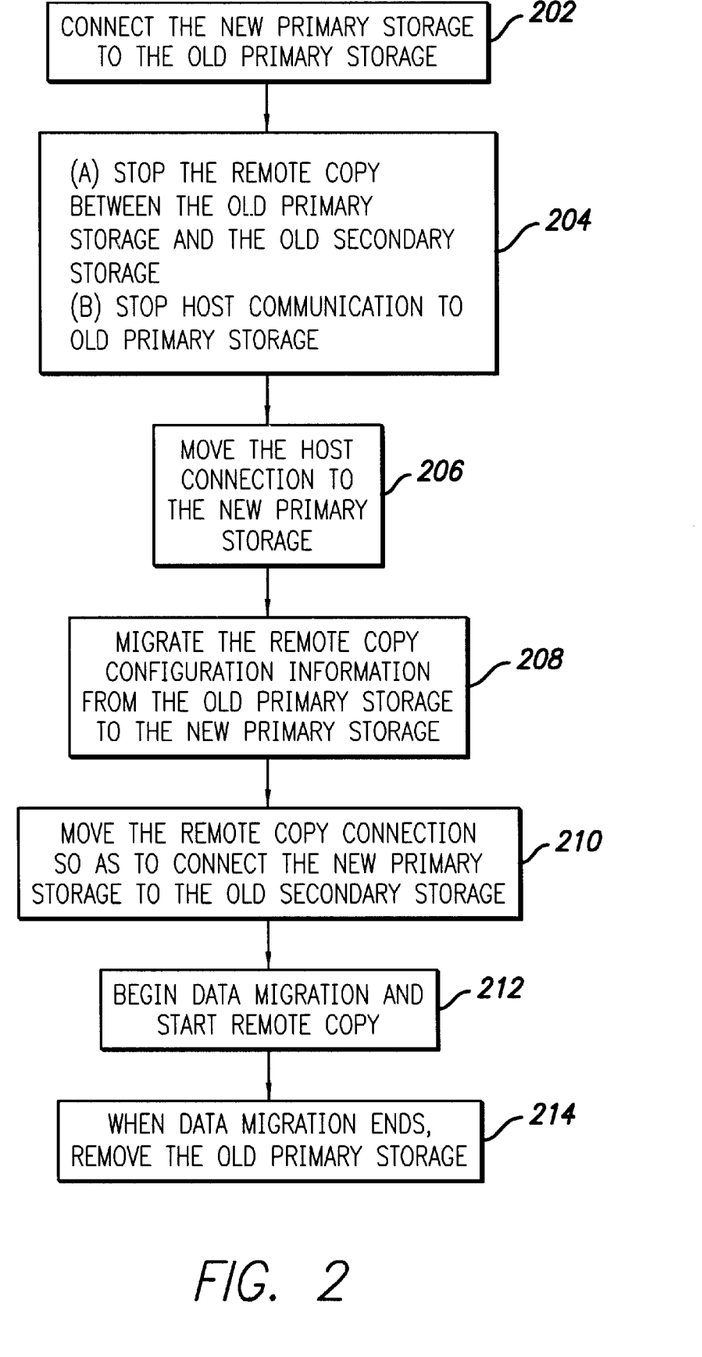
FIG. 2 shows a flow diagram of a method for replacing a primary storage system in accordance with an embodiment of the present invention.

Referring to action 210 of FIG. 2, connection 106 is removed and connection 107 (see FIG. 1) is established after the migration of the remote copy configuration information from the old primary storage system 102 to new primary storage system 103. In action 212, a remote copy function between new primary storage system 103 and old secondary storage 104 over connection 107 is started.

Also in action 212, migration of the rest of the data of old primary storage system 102 begins. During migration, requests to read data locations not yet migrated from old primary storage system 102 are serviced by new primary storage system 103 by reading the requested data from old primary storage system 102 over connection 108; new primary storage system 103 then provides the requested data to host processor 101 over connection 109. Write requests are serviced by new primary storage system 103 by writing the accompanying write data to both itself and old primary storage system 102 to maintain data integrity.

Figure 3:
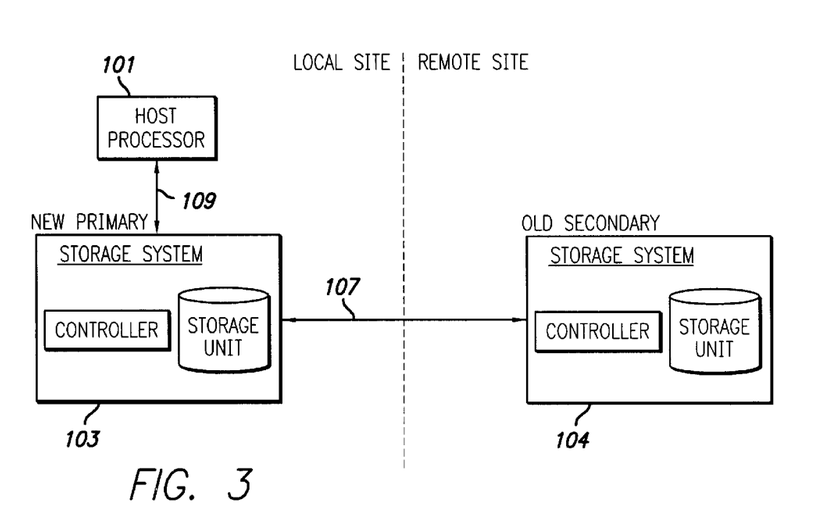
FIG. 3 schematically illustrates the final configuration of storage systems after an online data migration in accordance with an embodiment of the present invention.

In action 214, old primary storage system 102 is removed once all of its data have been migrated to new primary storage system 103. Of course, once the migration is complete, the system begins to operate normally, and special migration-related processes such as the process for writing to both the new and old primary storage systems are terminated. FIG. 3 schematically illustrates the final arrangement of host processor 101, new primary storage system 103, and old secondary storage system 104 after the online data migration has completed and the old primary storage system 102 has been accordingly removed.

The online data migration setup of FIG. 1 and the method of FIG. 2 allow for minimum disruption of the remote copy function. In the method of FIG. 2, remote copy is stopped in action 204, and is operational again in action 212. Because the migration of remote copy configuration information in action 208, and the movement of connections in actions 206 and 210 can be completed in a relatively short amount of time, the remote copy function is only down for a short period. Furthermore, the remote copy between the new primary storage system and the old secondary storage system does not have to be reconfigured, and is thus operational at the beginning of the online data migration in action 212.

Figure 4:
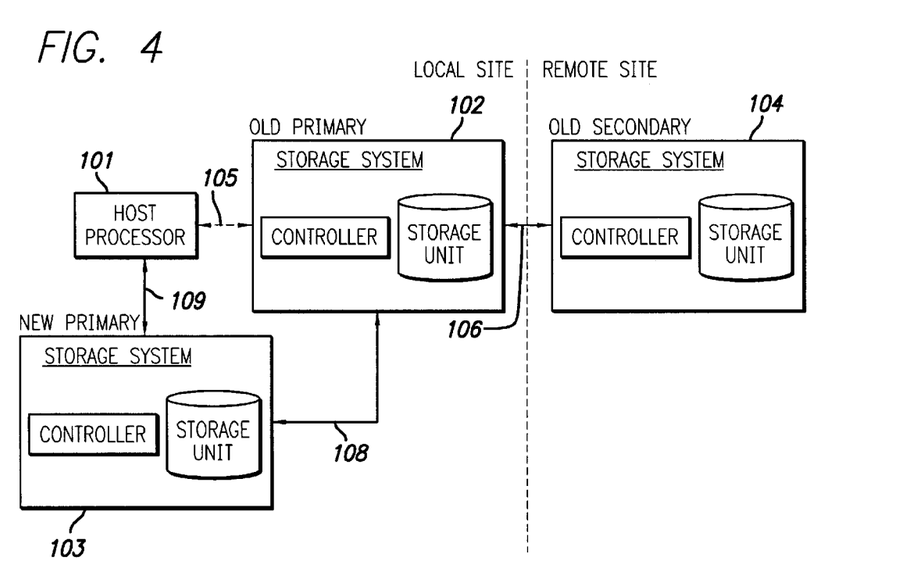
FIG. 4 schematically illustrates an online data migration setup for replacing a primary storage system in accordance with another embodiment of the present invention.

In the online data migration setup of FIG. 1 and method of FIG. 2, the host connection and the remote copy connection are re-routed to the new primary storage system prior to the beginning of the data migration. This results in a single service disruption period which starts in action 204 and ends in action 210. Depending on the application, the disruption period may also be divided into two: one for re-routing the host connection, and another for re-routing the remote copy connection. FIG. 4 schematically illustrates another online data migration setup for replacing a primary storage system with another from the same manufacturer, in accordance with an embodiment of the present invention. FIG. 4 is now described with reference to the method of FIG. 5. In action 502, replacing old primary storage system 102 with new primary storage system 103 begins by connecting old primary storage system 102 to new primary storage system 103 using connection 108 (see FIG. 4). Because new primary storage system 103 is not yet activated, action 502 can be performed without disrupting the operation of host processor 101, and the remote copy function between old primary storage system 102 and old secondary system 104. In action 504, communications between old primary storage system 102 and host processor 101 are disrupted. In action 506, connection 105 between host processor 101 and old primary storage system 102 is removed, and connection 109 (see FIG. 4) between host processor 101 and new primary storage system 103 is established.

Figure 5:
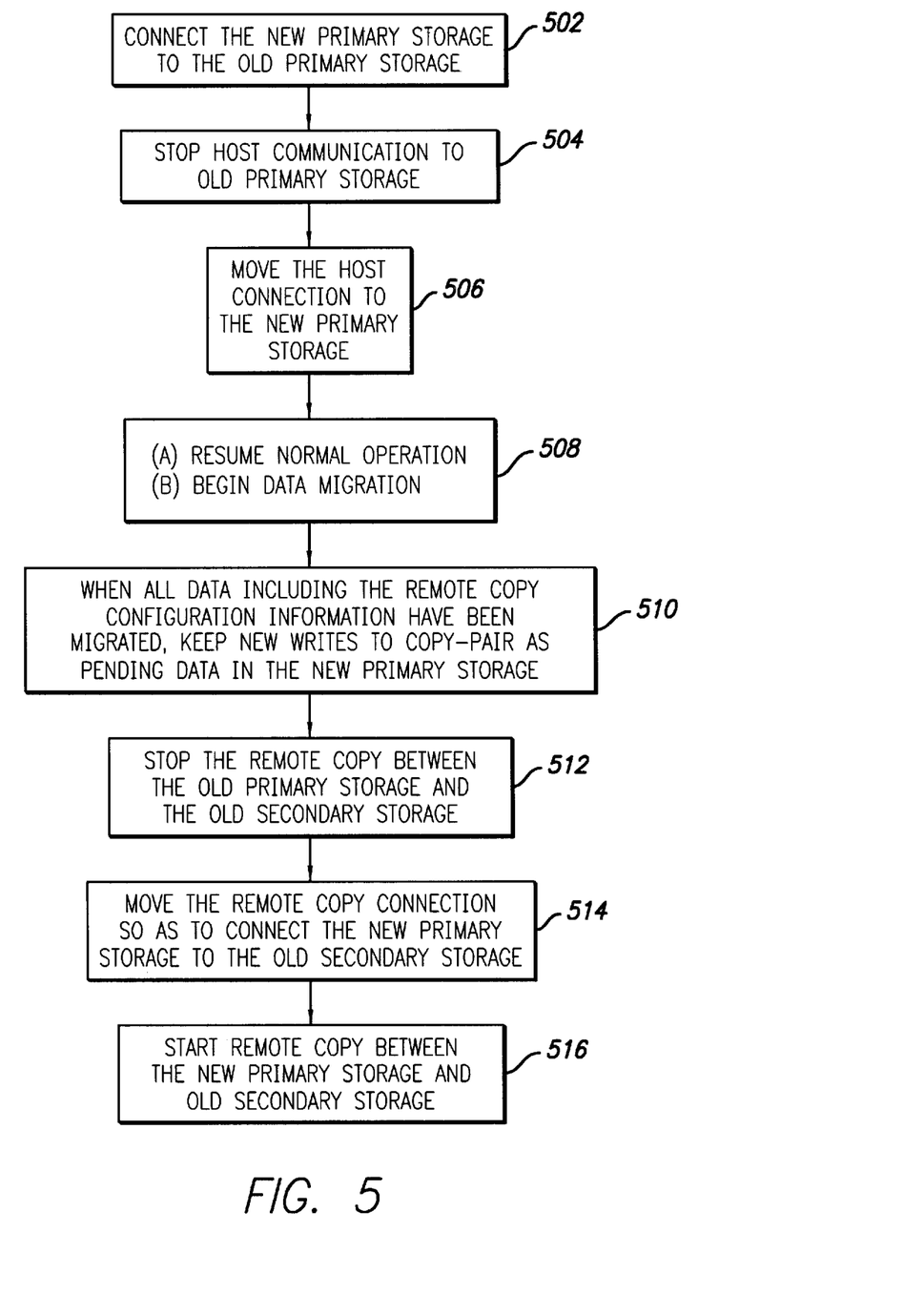
FIG. 5 shows a flow diagram of a method for replacing a primary storage system in accordance with another embodiment of the present invention.

In action 508, normal operations are resumed and the online data migration is started. That is, new primary storage system 103 can begin processing read and write requests from host processor 101 after connection 109 is established. During this time, requests to read data locations not yet migrated from old primary storage system 102 are serviced by new primary storage system 103 by reading the requested data from old primary storage system 102 over connection 108; new primary storage system 103 then provides the requested data to host processor 101 over connection 109. Write requests are serviced by new primary storage system 103 by writing the accompanying write data to both itself and old primary storage system 102. This maintains data integrity during the migration process, and allows the remote copy function between old primary storage system 102 and old secondary storage system 104 to keep on running. Note that connection 106, which is the remote copy connection between old primary storage system 102 and old secondary storage system 104, has not yet been disrupted.

At some point in time, all data, including the remote copy configuration information, of old storage system 102 will be migrated to new primary storage system 103. In action 510, new primary storage system 103 then begins treating all remote copy write data as pending data to be copied to old secondary storage system 104; this saves remote copy data during the time the remote copy function is disrupted. In action 512, the remote copy function between old primary storage system 102 and old secondary storage system 104 is disrupted. Optionally, old primary storage system 102 can be removed at this time. In action 514, the remote copy connection is re-routed by removing connection 106, and establishing connection 107 between new primary storage system 103 and old secondary storage system 104 as shown in FIG. 3. In action 516, remote copy is started between new primary storage system 103 and old secondary system 104, ending the online data migration process. As before, the remote copy does not have to be reconfigured.

Figure 6:
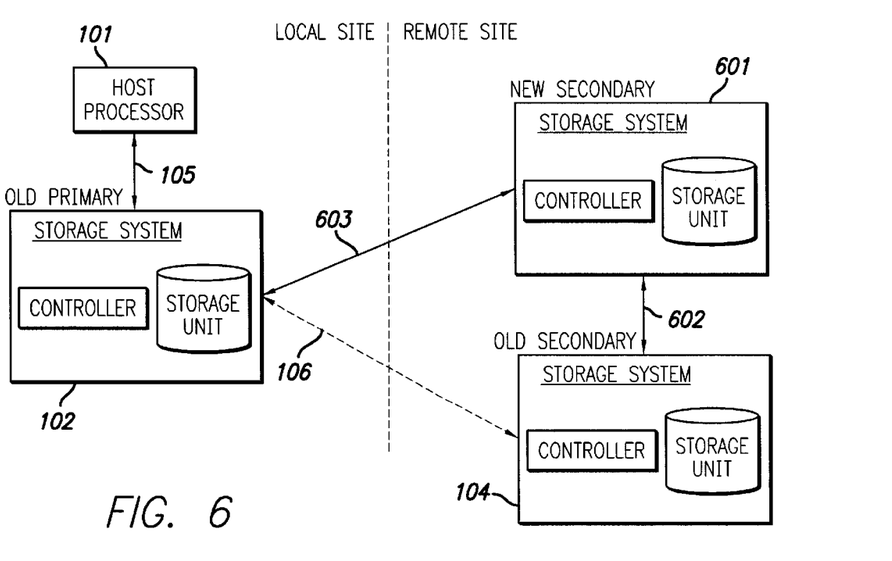
FIG. 6 schematically illustrates an online data migration setup for replacing a secondary storage system in accordance with an embodiment of the present invention.

The present invention may also be used in replacing an old secondary storage system with another from the same manufacturer. FIG. 6 schematically illustrates an online data migration setup for such an application, in accordance with an embodiment of the present invention. In FIG. 6, old secondary storage system 104 is to be replaced with a new secondary storage system 601, both of which are from the same manufacturer.

Figure 7:
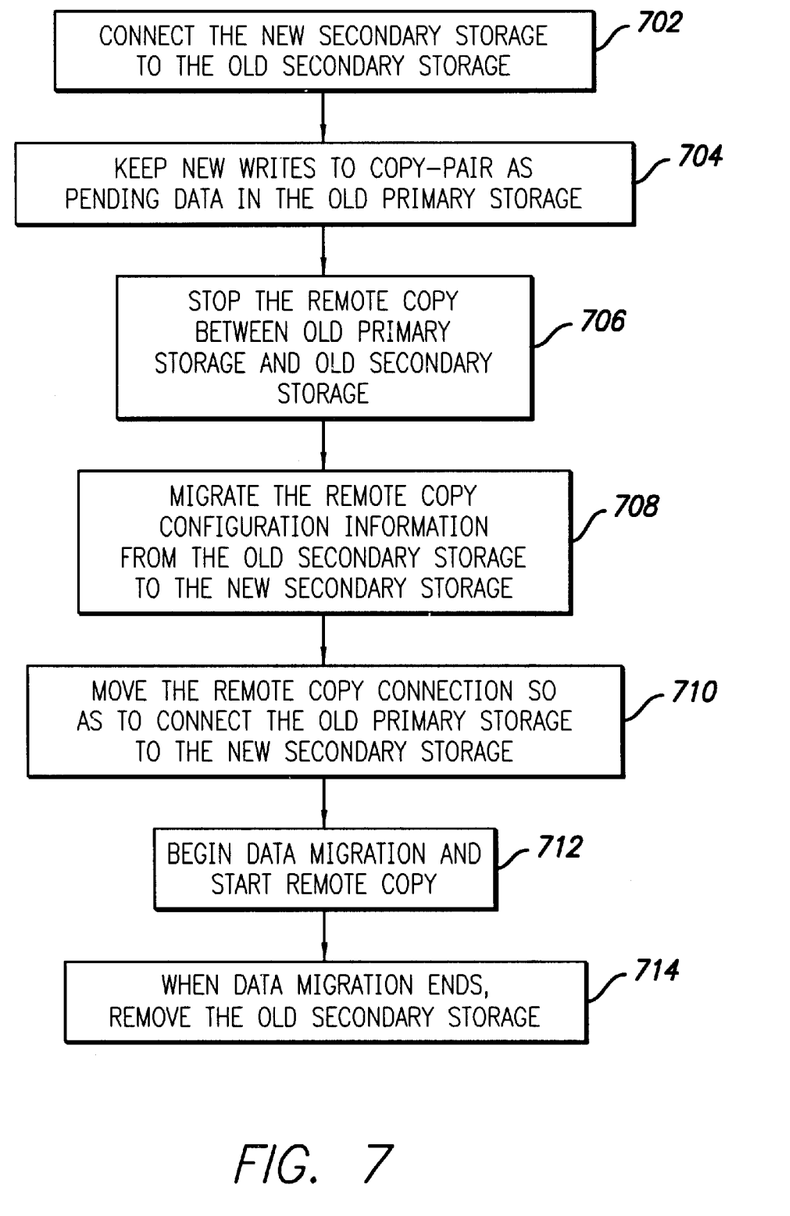
FIG. 7 shows a flow diagram of a method for replacing a secondary storage system in accordance with an embodiment of the present invention.

The setup of FIG. 6 is now described with reference to the method of FIG. 7. In action 702, new secondary storage system 601 is connected to old secondary storage system 104 via connection 602. As can be appreciated, action 702 can be performed without disrupting the remote copy function between old primary storage system 102 and old secondary storage system 104 over connection 106. In action 704, old primary storage system 102 begins treating all remote copy write data as pending data to be copied to new secondary storage system 601; this saves remote copy data during the time the remote copy function is disrupted. In action 706, the remote copy function between old primary storage system 102 and old secondary storage system 104 is disrupted. In action 708, the remote copy configuration information of old secondary storage system 104 is migrated to new secondary storage system 601. In action 710, the remote copy connection is re-routed by removing connection 106, and establishing connection 603 between old primary storage system 102 and new secondary storage system 601. In action 712, online data migration from old secondary storage system 104 to new secondary storage system 601 begins. Also in action 712, the remote copy function between old primary storage system 102 and new secondary storage system 601 is started. In action 714, old secondary storage system 104 is removed after the completion of the online data migration.

Figure 8:
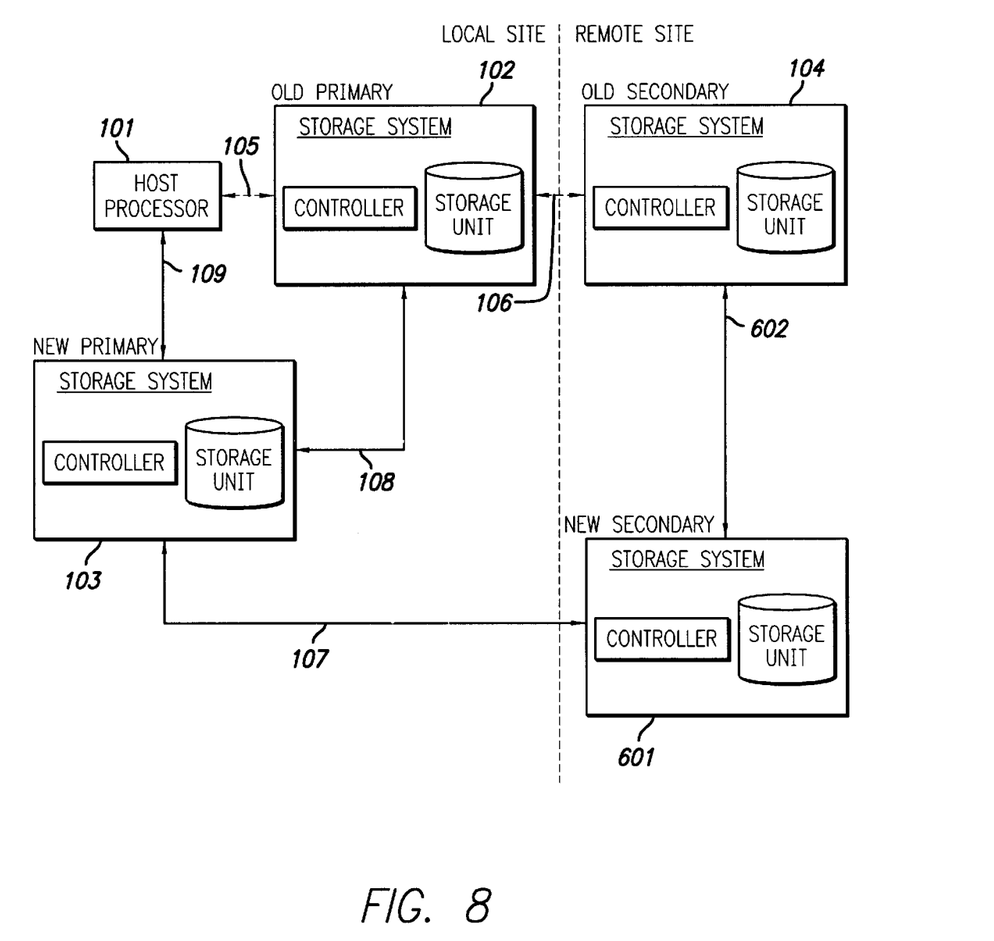
FIG. 8 schematically illustrates an online data migration setup for replacing a primary storage system and a secondary storage system in accordance with an embodiment of the present invention.

As can be appreciated, replacing both the old primary storage system and the old secondary storage system in the same migration process can be accomplished by combining the just described techniques for replacing individual storage systems in the local and remote sites. FIG. 8 schematically illustrates an online data migration setup for replacing old primary storage system 102 with new primary storage system 103, and old secondary storage system 104 with new secondary storage system 601 in accordance with an embodiment of the present invention. In one embodiment, all the storage systems depicted in FIG. 8 are from the same manufacturer (as will be described later on below, the online data migration setup of FIG. 8 may also be used in replacing a storage system with another from a different manufacturer). FIG. 8 is now described with reference to the method of FIG. 9. In action 902, new primary storage system 103 is connected to old primary storage system 102 via connection 108, and new secondary storage system 601 is connected to old secondary storage system 104 via connection 602 (see FIG. 8). In action 904, the remote copy function between old primary storage system 102 and old secondary storage system 104, as well as communications between old primary storage system 102 and host processor 101 are disrupted.

In action 906, connection 105 between host processor 101 and old primary storage system 101 is removed, and connection 109 (see FIG. 8) between host processor 101 and new primary storage system 103 is established.

Figure 9:
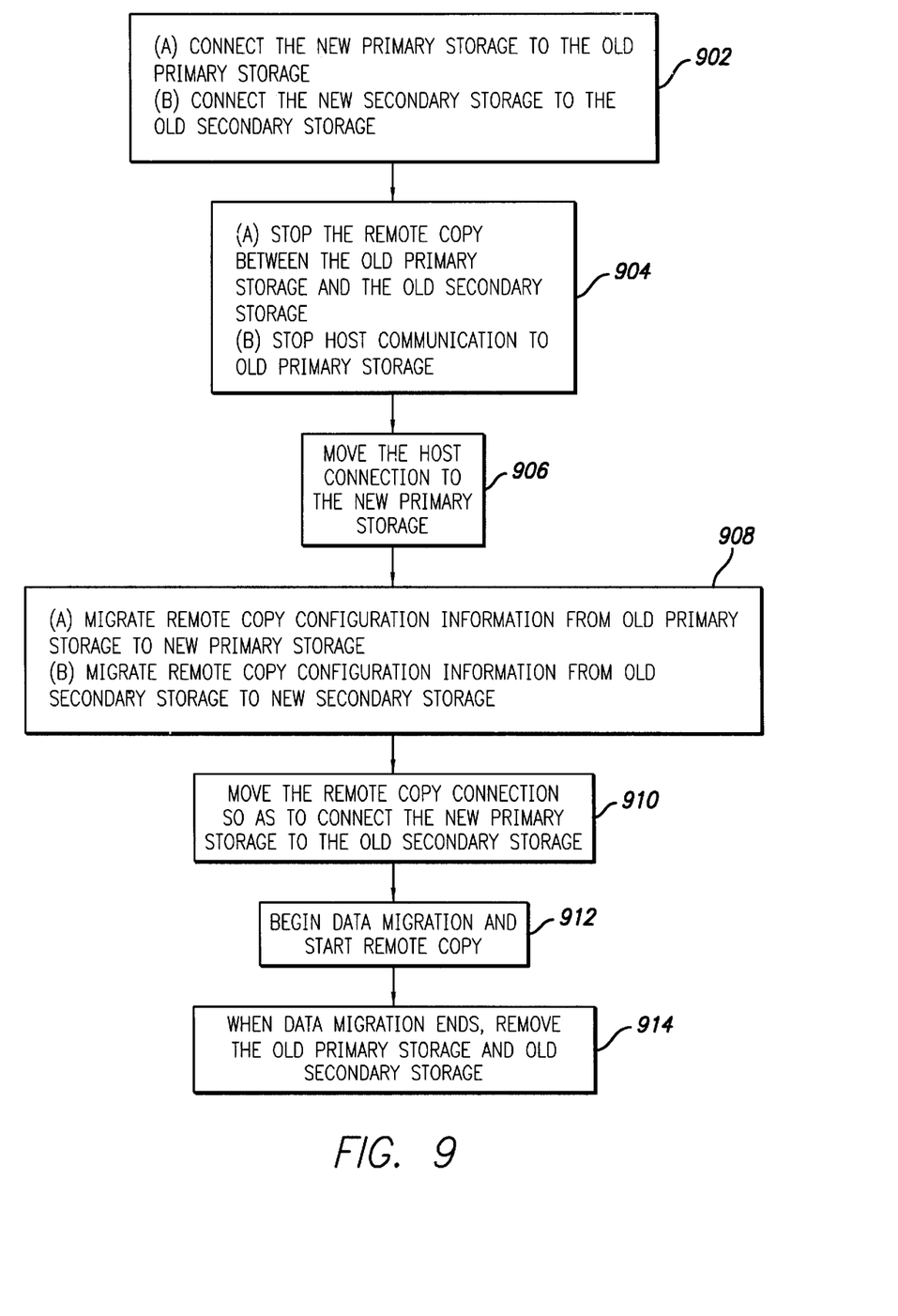
FIG. 9 shows a flow diagram of a method for replacing a primary storage system and a secondary storage system in accordance with an embodiment of the present invention.

In action 908, remote copy configuration information is migrated from old primary storage system 102 to new primary storage system 103 via connection 108. Also in action 908, remote copy configuration information is migrated from old secondary storage system 104 to new secondary storage system 601 via connection 602.

In action 910, the new remote copy connection is established by removing connection 106, and establishing connection 107 (see FIG. 8) between new primary storage system 103 and new secondary storage system 601.

In action 912, online data migration processes from old primary storage system 102 to new primary storage system 103, and from old secondary storage system 104 to new secondary storage system 601 are started. Also in action 912, remote copy between new primary storage system 103 and new secondary storage system 601 over connection 107 is started. Note that because remote copy configuration information has been previously migrated to the new storage systems, remote copy is available as soon as connection 107 is established. At this point, new primary storage system 103 can begin processing read and write requests from host processor 101. Requests to read data locations not yet migrated from old primary storage system 102 are serviced by new primary storage system 103 by reading the requested data from old primary storage system 102 over connection 108; new primary storage system 103 then provides the requested data to host processor 101 over connection 109. Write requests are serviced by new primary storage system 103 by writing the accompanying write data to both itself and old primary storage system 102. This maintains data integrity during the data migration and remote copy function.

In action 914, the old storage systems can be removed as soon as their respective online data migration ends.

The present invention can also be used in replacing old storage systems with new storage systems from a different manufacturer. For example, the online data migration setup of FIG. 8 and the method of FIG. 9 can also be used in online data migration between storage systems from different manufacturers. In that case, old primary storage system 102 and old secondary storage system 104 will be from one manufacturer, and new primary storage system 103 and new secondary storage system 601 will be from another. The setup and method will be similar to that shown in FIGS. 8 and 9, except that the migration of remote copy configuration in action 908 involves a prior action of converting the remote copy configuration of the old storage systems to the same format as that used by the new storage systems. Manufacturers typically provide a system management tool for accessing remote copy configuration information, which can then be reformatted manually via a service console or automatically using a script. The reformatting of remote copy configuration information can be performed before the new storage systems are brought onsite (i.e., before action 902). Once reformatted, the remote copy configuration can then be migrated from the old storage systems or simply copied over to the new storage systems in action 908.

Methods, systems and apparatus for performing online data migration with remote copy have been disclosed. While specific embodiments have been provided, it is to be understood that these embodiments are for illustration purposes and not limiting. For example, although the provided exemplary embodiments demonstrate the replacement of a single storage system, the present invention can be used in replacing multiple storage systems. Because many additional embodiments will be apparent to persons of ordinary skill in the art reading this disclosure, the present invention is limited only by the following claims.

What is claimed is:

1. A method for performing online data migration comprising:

coupling a first storage system to a second storage system, wherein the first storage system is destined to be replaced with the second storage system;

migrating remote copy configuration information from the first storage system to the second storage system;

coupling the second storage system to a third storage system remotely located from the first storage system; and migrating data from the first storage system to the second storage system while data are being transferred between the second storage system and the third storage system in accordance with the remote copy configuration information.

2. The method of claim 1 further comprising the following acts to be performed before migrating the remote copy configuration information from the first storage system to the second storage system:

removing a host connection between the first storage system and a host processor; and coupling the host processor to the second storage system.

3. The method of claim 1 further comprising:

saving remote copy data as pending data in the second storage system to be written to the third storage system prior to a disruption of a remote copy connection between the first and third storage systems.

4. The method of claim 1 wherein the first storage system and the second storage system are primary storage systems, and the third storage system is a secondary storage system designated to mirror a primary storage system.

5. The method of claim 1 wherein the first storage system and the second storage system are secondary storage systems, and the third storage system is a primary storage system that is mirrored by a secondary storage system.

6. The method of claim 1 wherein the first storage system and the second storage system each includes one or more disk units.

7. A system for performing an online data migration comprising:

a first storage system located in a first location;

a second storage system located in the first location and containing remote copy configuration information, the second storage system being designated to be replaced with the first storage system, the second storage system being coupled to the first storage system during an online data migration from the second storage system to the first storage system;

a third storage system located in a second location;

a remote copy connection coupling the third storage system to a storage system in the first location, and wherein during the online data migration the remote copy connection is operable to carry data according to the remote copy configuration information.

8. The system of claim 7 wherein the first storage system and the second storage system are primary storage systems, and the third storage system is a secondary storage system designated to back-up the first storage system over the remote copy connection.

9. The system of claim 7 wherein the first storage system and the second storage system are secondary storage systems, and the third storage system is a primary storage system that is backed-up by the first storage system over the remote copy connection.

10. The system of claim 7 wherein the remote copy connection couples the third storage system to the first storage system.

11. The system of claim 7 wherein the remote copy connection couples the third storage system to the second storage system.

12. The system of claim 7 wherein the first storage system is coupled to a mainframe host processor.

13. The system of claim 7 wherein the first storage system and the second storage system are from the same manufacturer.

14. The system of claim 7 wherein the first storage system and the second storage system are from different manufacturers.

15. A method for performing online data migration comprising:

coupling a first primary storage system to a second primary storage system;

coupling the first primary storage system to a host processor;

migrating remote copy configuration information from the second primary storage system to the first primary storage system; and migrating data from the second primary storage system to the first primary storage system while data are being transferred between the second primary storage system and a secondary storage system in accordance with the remote copy configuration information.

16. The method of claim 15 wherein the host processor includes a mainframe host processor.

17. The method of claim 15 wherein the first primary storage system, the second primary storage system, and the secondary storage system each includes one or more disk units.

18. The method of claim 15 further comprising:

removing the second primary system; and coupling the first primary storage system to the secondary storage system after the completion of data migration from the second primary storage system to the first primary storage system.

19. The method of claim 15 further comprising:

saving remote copy data as pending data in the first primary storage system to be written to the secondary storage system when a remote copy connection between the first primary storage system and the secondary storage system becomes available.

20. The method of claim 15 wherein the first primary storage system and the second primary storage system are from the same manufacturer.

* * * * *